Patented Nov. 27, 1934

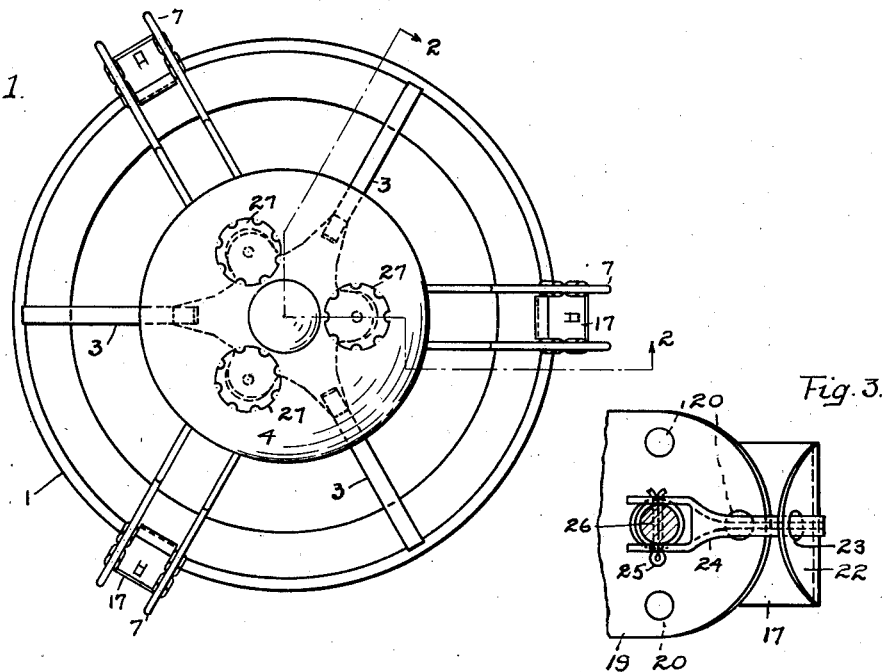
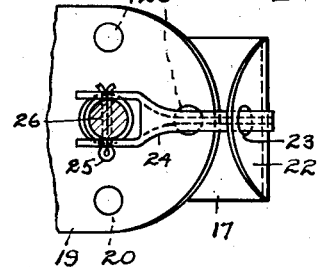
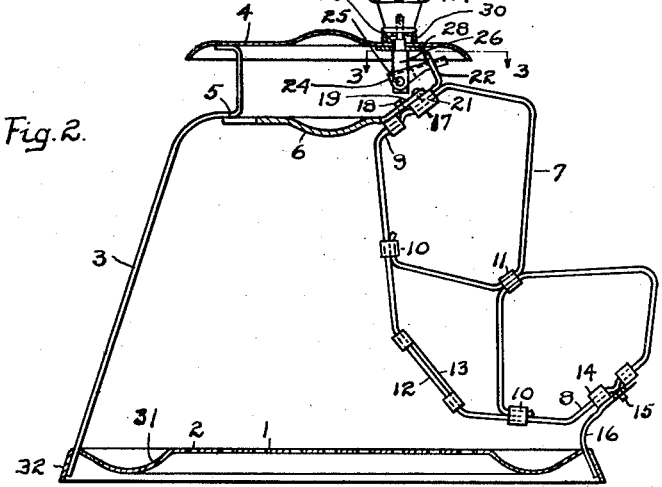
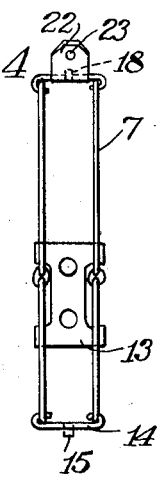

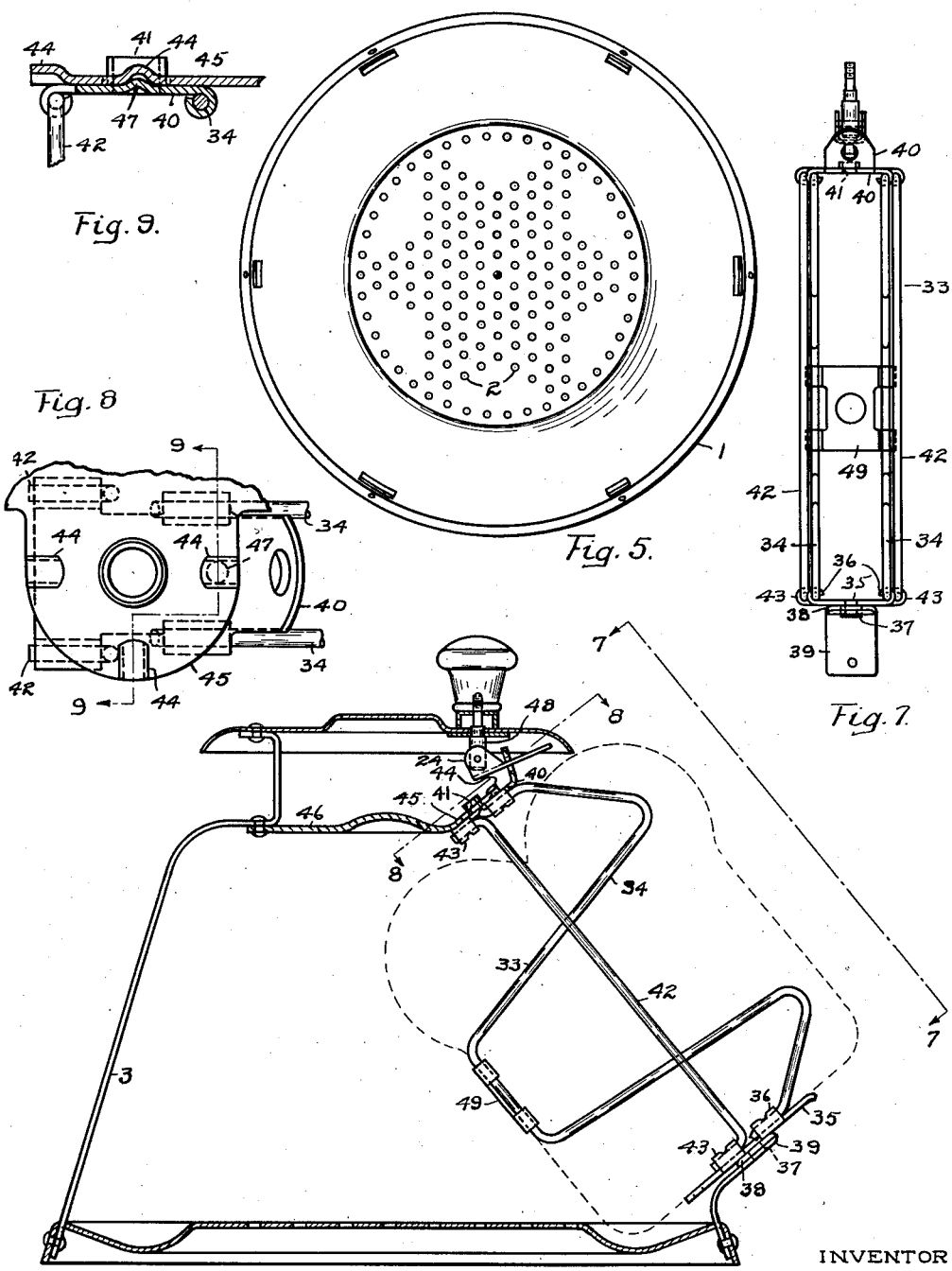

1,982,494

UNITED STATES PATENT OFFICE 1,982,494

TOASTER

Raymond W. Bond and Otto A. Hokanson,
Fort Wayne, Ind.

Application April 14, 1933, Serial No. 666,185

7 Claims. (Cl. 53—5)

The invention relates to devices upon which to toast bread and the like, primarily over a gas or oil burner or stove.

The object of the invention is to provide a simple toaster that is sanitary and efficient and economical of operation.

Another object is to provide a toaster adapted to be economically constructed and easily operated and on which the toast is easily handled in a sanitary manner.

Another object is to provide a toaster adapted to revolubly support a plurality of slices of bread or other articles in such manner that each slice may be turned independently and thereby secure any selected degree of toasting of such slice.

Another object is to provide a toaster adapted to revolubly support one or more slices of bread or other articles in such manner that the rotation of each support upon its axis is limited to prevent the inversion thereof and avoid the inward discharge of the bread into the interior of the toaster.

Another object is to provide a toaster wherein revolubly mounted holders for the slices of bread are independently rotated in novel manner and in which the motion initiating members are insulated against the heating medium.

Another object is to provide a toaster wherein a plurality of bread holders are mounted at such an angle upon a base that the entire surface of the bread is uniformly toasted.

Another object is to provide a toaster wherein one or more bread holders are so revolubly mounted that in their loading or unloading position an edge of the bread or toast is farthest removed from the heating medium.

The invention is illustrated in the accompanying drawings in which

Figure 1 is a plan view of a toaster embodying the invention; Fig. 2 a cross section on line 2—2 of Fig. 1; Fig. 3 a cross section in enlarged scale on line 3—3 of Fig. 2; Fig. 4 a plan view of one of the holders; Fig. 5 a plan view of the base; Fig. 6 a cross-section of a modified form of the toaster frame, bread holder and rotating means therefor; Fig. 7 an end elevation of the modified holder taken on line 7—7; Fig. 8 a cross-section in enlarged scale on line 8—8 of Fig. 6 and Fig. 9 a cross-section on line 9—9 of Fig. 8.

Referring to the illustrative embodiment of the invention 1 represents the heat distributing base having a predetermined number of apertures 2 therein. A plurality of standards 3 (three being shown) is secured at the lower end to the base, the upper ends of the standards being secured to the upper member 4 of the top. The upper portion of each standard is turned inwardly and upwardly to form a shoulder 5 that is spaced from the member 4, and a heat deflecting spider 6, which is less in diameter that the base 1, forms the lower member of the top and is secured to each of the shoulders. Midway between each two adjacent standards 3 is revolubly mounted a bread holder 7. The apertures 2 in the base are of predetermined size and are preferably arranged, as shown in Fig. 5, in the form of a star, the points of which extend toward the standards and the axes of the holders respectively and a circular row of the apertures joins, as it were, the tips of the points. This arrangement of the apertures tends to distribute the heat medium uniformly under the top so that the surface of the bread exposed thereto is uniformly toasted. The annular depression 31 in the base is such that it not only strengthens the top wall of the base but it receives the lower corners of the slices of bread carried in the holders and permits free movement of the slices as hereinafter explained. The peripheral wall 32 of the base tends to retain the heat or flame under the top of the base and thereby prevents such heat or flame from passing outwardly under the side edge of the base.

In the drawings we show three bread holders 7, but it is to be understood that as many of such holders may be used as desired. Each holder is somewhat like a pocket and in one form of the invention it is formed, preferably of wire of suitable size, in two side members, in each of which, as shown in Figs. 1, 2 and 3, the opposite ends of a length of wire are bent upon themselves or looped so as to form two parallel sections 8, 9 at the opposite ends of the holder. The free ends of the wire are secured to the central portion thereof by the clips 10 and the loops are secured together by the clip 11. A section 12 of the wire forms a right angle with the end section 8, 9. A plate 13 is clipped to the section 12 of each side member and not only ties the said members together but also forms a back wall for the bread that is inserted between the two side members. A plate 14 is clipped to the section 8 of each side member and it carries a stud 15 that is received in an aperture formed in the bracket 16 which is secured to the base and projects upwardly and outwardly at a selected angle to the base, the upper end of the bracket being substantially parallel to the sections 8 of the holder.

The upper sections 9 of the side members are connected in spaced relation by the plate 17 which is clamped to said sections and carries a stud 18 that is received by an aperture in an upwardly inclined flange or ear 19 formed on the spider 6. The flange or ear 19 is projected upwardly at three points so as to form three depressions 20 on the side thereof in any one of which a corresponding elevation 21 on the plate 17 will engage to form a stop as hereinafter explained. Preferably the stops are ninety degrees apart.

One end of the plate 17 is turned upwardly to form a flange 22 that is apertured at 23 to loosely receive the outer end of the drive arm 24. The inner end of the arm is bifurcated and pivoted at 25 to the lower end of a drive shaft 26 which extends through an aperture in the top member 4 and is engaged at its upper end to a knob 27. The shaft is reduced where it passes through the top 4 and a washer 28 is pressed on the shaft and is disposed between said top and the shoulder 29 on the shaft. This washer stabilizes the shaft and holds it in a vertical position. An insulating cup 30 is engaged between the top member 4 and the knob 27 and tends to dissipate the heat so that the knob may be comfortably grasped by the fingers for rotating the shaft 26.

In Figs. 1 and 2 the bread holders are radially disposed or in loading or unloading position. In this position the elevation 21 engages the intermediate depression 20 and holds the plate 17 and the ear 19 from unauthorized movement. When a slice of bread has been inserted in the holder and abuts the tie plates 13, 14 the operator rotates the knob in either direction to drive the shaft 26 and swing the arm 24. The arm 24 carries the flanged plate 17 with it and through them the holder is turned on its pivotal points 15, 18 the movement being stopped when the elevation 21 engages the depression 20 at the side of the ear 19 which is in the path of the moving projection. At this point one side of the holder faces inwardly to expose the adjacent side of the bread to the heat that rises from the base. To reverse the slice the knob is rotated 180° in the opposite direction, the projection 21 engaging in the other depression at the opposite side of the ear to lock the plate 17 to the ear 19.

Since the spider is less in diameter than the base, the upper pivotal point of each holder is so located with respect to the lower pivotal point that the longitudinal axis of the holder is declined outwardly whereby to similarly decline the product to be toasted and expose the entire side of the same at such an angle to the base as to give uniform toasting over the entire surface of the product. When the holder is rotated to reverse the product, the product is thereby turned on its axis so that the opposite side thereof is exposed to the heat in the same location that the other side was exposed. Hence both sides of the product are toasted uniformly. Any holder may be turned at any time for the purpose of observing the progress of the toasting operation, or to give any desired degree of toasting to the product therein independently of the other products being toasted at the same time. The holder in Figs. 1, 2 and 3 is so shaped that the four corners of a slice of bread are held from curling, which they have a tendency to do when the slice is warming up.

In Figs. 6–9 a modified form of the toaster is illustrated in which each holder 33 is more simple and more rigid than the previously described form, and in many respects it is preferred to the holder 7. The holder 33 is pocket shaped, each side being formed by a wire 34 bent as shown in Fig. 6 with its opposite ends substantially parallel. The lower end of each wire is attached to the plate 35 by the clip 36 that is bent over said end and the extremity of the said end is bent down to prevent its longitudinal withdrawal from the clip. An annular extrusion 37 is formed on the plate 35 which engages in alined apertures formed in the washer 38 and the bracket 39 that corresponds to the bracket 16, thus forming a lower pivot for the holder.

The upper end of each wire 34 is similarly connected to the plate 40 that corresponds to the plate 17, the plate 40 having an annular extrusion 41 that extends through an opening formed in the ear 45 and forming an upper pivotal mounting for the holder.

The plates 35, 40 tie in spaced relation the two sides of the holder formed by the wires 34 and the plate 49 that is clipped to said wires also ties said sides and forms a wall against which the edge of the slice of bread rests, another edge of the slice resting on the lower plate 35 as shown in broken lines in Fig. 6.

To provide rigidity to each holder 33 reinforcing rods 42 each having a right angle bend at its opposite ends are attached to the plates 35, 40 by the clips 43, the rods being disposed on the outside of the sides of the holder.

The stop members 44 on each ear 45 of the spider 46 are elongated so as to assure engagement of the projection 47 on the plate 40.

The shaft 48, corresponding to the shaft 26, is shorter than the shaft 26 and the arm 24 is inverted.

The spider 6 acts as a heat deflector since it deflects the heat to the upper part of the bread being toasted and it also prevents excessive heat from contacting the top member 4, which top member shields the knobs 26 from the heat of the device, since it overhangs the spider member 6.

The stops limit the rotating movements of the holders so that each holder will not invert or turn upside down and permit the toasting product to drop out of it onto the base.

When any holder is moved to the radial position, as shown in Figs. 1, 2 and 6, which position is the loading or unloading position, and a slice of bread is inserted into the holder or a slice of toast is removed, the outermost edge of the slice which is grasped to accomplish such insertion or removal is farthest removed from the heating medium. Hence the fingers need touch an edge of the slice for insertion or removal purposes only, no other handling of the slice being necessary while the toasting operation is going on.

We claim:

1. A toaster comprising a heat distributing base, a top supported on the base, a heat deflecting member spaced below the top, a plurality of holders pivotally mounted at opposite ends on the base and the deflecting member and means for individually turning the holders to predetermined limited positions.

2. A toaster comprising a plurality of holders, a frame including a heat distributing base and a heat deflector, means for pivotally mounting the holders between said base and deflector and means for individually turning the holders to predetermined toasting and loading positions.

3. A toaster comprising a plurality of holders, a frame including a heat distributing base and a heat deflecting member, means for pivotally mounting the holders between the base and the deflecting member, means above the heat deflecting member and insulated therefrom and having driving connection with the holders for turning them individually to predetermined limited positions.

4. A toaster comprising a frame including a heat distributing base, a top member and a heat deflector spaced from the top member, a plurality of holders pivotally mounted between the base and the deflector, revoluble members above and insulated from the top member and having driving connection with the holders respectively for turning the holders independently and means to limit the turning movement of each holder to toasting and loading positions.

5. A toaster comprising a frame including a heat distributing base, a heat deflector and members supporting the deflector on the base, a plurality of inclined bread holders pivotally mounted between the base and the deflector, members insulated from the heat deflector and having driving connection with the holders respectively for turning the holders independently and cooperating means on each holder and the heat deflector to limit the turning movement of the holder to predetermined toasting and loading positions.

6. A toaster comprising a frame including a perforated base and a heat deflector supported above the base, a plurality of bread holders pivotally mounted at opposite ends on the base and the deflector, a plurality of revoluble shafts above the deflector each having an arm pivoted thereto and loosely engaging a holder and means on each shaft to rotate the same and cause the holder to turn to predetermined toasting and loading positions.

7. A toaster comprising a plurality of holders, a frame including a heat distributing base and a heat deflecting member, means for pivotally mounting the holders between the base and the deflecting member, means above the heat deflecting member and insulated therefrom and having driving connection with the holders for turning them individually to predetermined limited positions, said means including an overhanging top member for shielding the driving connection from excess heat.

RAYMOND W. BOND.
OTTO A. HOKANSON.